L. F. PERRON.
COMBINATION GUIDE AND LINE CLASP FOR FLOATS.
APPLICATION FILED JULY 11, 1913.
1,152,755.
Patented Sept. 7, 1915.
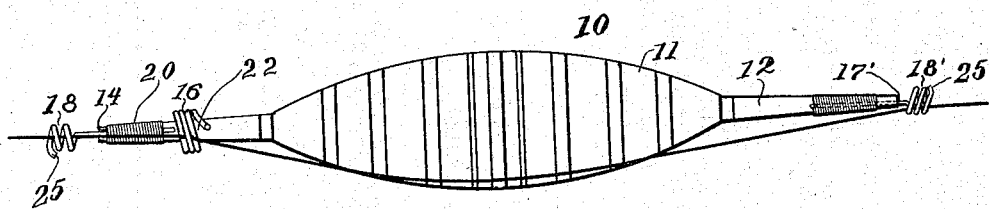
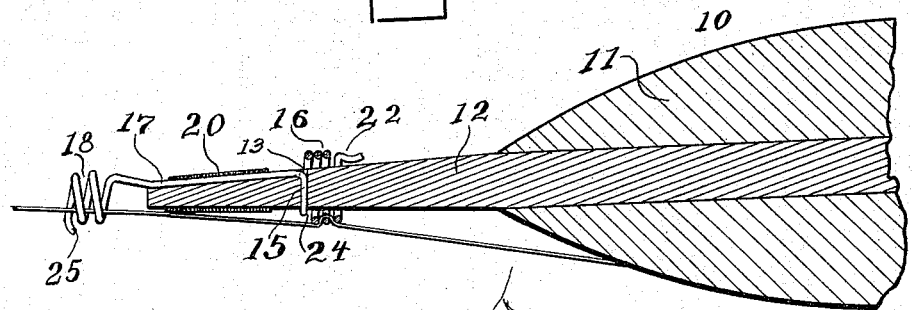
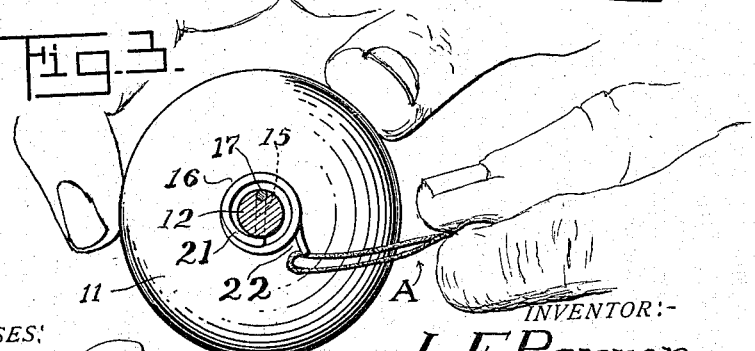
WITNESSES:
L. Cloud Newman.
Chr. R. Nielsen.
INVENTOR:—
L. F. Perron,
By H. L. Woodward
Attorney

UNITED STATES PATENT OFFICE.

LOUIS F. PERRON, OF BALLSTON, VIRGINIA.

COMBINATION GUIDE AND LINE-CLASP FOR FLOATS.

1,152,755.  Specification of Letters Patent.  Patented Sept. 7, 1915.

Application filed July 11, 1913. Serial No. 778,522.

*To all whom it may concern:*

Be it known that I, LOUIS F. PERRON, a citizen of the United States, residing at Ballston, in the county of Alexandria and State of Virginia, have invented new and useful Improvements in Combination Guides and Line-Clasps for Floats, of which the following is a specification.

An object of the invention is to provide in one element a line guide of the familiar wire spiral form, for the end of a float stem, and a line clasp or holder adapted to secure the line adjustably to the float.

A further purpose is to simplify the construction and enable the combined device to be secured in place in the manner usually employed in securing the guide without requiring a special formation of the stem, or more than the ordinary wrapping.

Another object is to so construct the device that the guide and clasp will coöperate to maintain each other in proper operative positions.

An aim is to form the device so that the clasp will hold the line when engaged out of contact with the stem, so that under the jars and tugs transmitted through the line the engaged portion will not be abraded by the continuous rubbing of one part against the stem, under the resilient movement of the clasp.

A very important purpose is to provide a line holder that will not subject the line to abrupt strain when suddenly pulled taut, and which will also allow the line to extend past the float in the most direct way, without requiring any loops in the line, and involve a minimum of difficulty in threading the device.

Additional objects and advantages will appear, some of which will be apparent from the following description and from the drawings, in which, Figure 1 is an enlarged fragmentary sectional view of a float constructed in accordance with my invention, Fig. 2 is a side view of the complete float, Fig. 3 is a cross section through the stem.

There is illustrated a float 10 of usual construction, the form and structure of which, however, may be varied as desired, as the device is applicable to various other forms of floats. The present float comprises a body 11 of cork, circular in cross section and ovate in longitudinal section bored axially and fitted with a stem 12 of wood or other suitable material, the end portions of which project beyond the float body a suitable distance. Each end of the stem is grooved on one side longitudinally for from the extremity to a point intermediately of the projecting portion, terminating at a transverse opening 13, the grooves being numbered 14. Engaged in one opening 13 there is the transverse stem 15 of a helical clasp or clip 16, which will be subsequently described in detail, and from the outer end of the stem there is continued a stem 17 laid in the groove 14, of a spiral line guide 18. The stems 15 and 17, and devices formed thereon, are preferably of German silver wire of about Number 16 B. & S. gage, although brass and other materials may be used, and the size wire may be varied to suit the nature of the game to be caught with the line to be held, the size of the line, and size of the float. The outer end of the stem 17 is bent to form a spiral eccentrically of the stem 17, and which may be disposed eccentrically of the stem 12, or, as illustrated located concentrically with relation thereto, the former arrangement serving to guide the line clear of the stem of the float. The stem 17 is held securely in the groove (which is just deep enough to let the outer side of the stem lie flush with the surface of the float stem) by wrapping 20, preferably of silk. The wire at the outer end of the stem 15 is bent abruptly and transversely around the stem-12 a short distance and then slightly eccentric thereto, as at 21, and when spaced from the stem slightly more than the thickness of the line to be held, is continued in a concentric helical spring the helices of which are in close contact, whereby the clip 16 is formed. The outer end of the wire of the clip is bent divergently from the adjacent helix, whereby an entrance throat 22 is formed in which the line to be held may be entered as will be explained. By the reduction in the size of the first part of the helix, the concentric portion is held spaced clear of the stem 12, as may be observed. A guide 18' having a stem 17' set in the groove, is fixed at the opposite end of the stem 12.

In use, in order to engage a line with my float as above described, it is unnecessary to remove any of the hooks or sinkers which may be already attached, and the line need not be detached from the pole or reel. It will be noted that all of the helices of the clip and guides extend in a clock-wise direction from their bases toward their outer ends. The line should first be engaged with the clip, which may be most readily accomplished by holding a short loop of the line in one hand as at A, Fig. 3, presenting the bight in the throat 22 while the float is rotated or twirled in the other hand in a counter clock wise direction, until the loop is forced on to the second helix a suitable distance, preferably opposite to the throat 22, as in Fig. 1. The respective portions of the line outwardly of the clip are then wound between the helices of the adjacent guides from the base outward in the same direction with the coils of the guides, which will adjust the lines within the guides as illustrated, this operation being well understood. In this way the line extends in one guide, past the body of the float and out through the opposite guide, without being twisted or wound around anything, without being knotted and with a minimum liability of entanglement. By having the first inner coil of the clip spaced from the second at its beginning, as at 24, the clip will have a certain amount of springy movement longitudinally of the stem, so that under abrupt movement of the line, or in case the float becomes hung, the line is not subjected to abrupt strain, and the liability of breakage is minimized.

It should be noted however, that with an ordinary bass or trout line, and the weight of wire indicated for forming the clip, the line is not bound by the clip against slipping under any strain. A pull of in the neighborhood of one pound is sufficient to move the clip along the line, and this enables the device to be adjusted with a facility impossible where the line is locked against movement, as well as further reducing the liability of breakage. It is unnecessary to remove the line from the clip to adjust the float to different heights on the line, as one may be held while the other is slipped along, without damage to the line, for the wire is quite smooth and the line will not be abraded.

The clip is engaged with the line on that side of the float next the hooks, and which should be the lower part. The weight of the clip will aid in maintaining the float in an erect position, which is the most desirable for a float of this kind to assume, as it possesses greater stability, and is not as greatly affected by surface ripples. In consequence of the adjustment of the clip on this end of the float, a further advantageous function is derived, the line being held more forcibly against movement inward toward the pole or land end, than toward the hooks, so that "bites" or pulls on the line caused by fish will not tend to easily displace the float from adjusted position, causing the bait to hang too deep, without the user observing the fact. This function results because the clip spring tends to expand under a pull on the line away from the base toward the outer end of the clip, while a pull in the opposite direction slightly compresses the clip upon the line.

It will be appreciated from the foregoing that a simple and efficient guide and clip is provided, adapted to be secured upon a float in a simple manner without liability of loss of any parts, and having peculiar advantages desirable in the art.

In the attachment of the guide and clip, it may be formed upon the stem, or formed before attachment. The wire may be inserted through the aperture 13, and after the first coil of the clip has been partly formed close against the stem, a small split sleeve may be engaged around the inner part of the stem and the concentric helices wound thereon, after which the sleeve is slipped inwardly from the clip and removed. The opposite portion of the wire may then have the guide 18 formed thereon in the usual way (or this may be formed before the wire is inserted in the opening 13), and the intermediate end portion is laid in the adjacent groove, and the two stems (12 and 17) wrapped. As an alternative, the complete clip and guide may be formed before attachment, in the shape illustrated, the stem 12 having the opening 13 and groove 14 formed therein and being split in a plane with the opening 13. The clip is then presented over the end of the stem, the stem 15 being forced into the split and moved inwardly through the stem 12 until it snaps into the opening 13, after which the wrapping serving to give the before, the wrapping serving to give the stem the necessary strength notwithstanding the split. A waterproof cement may of course be introduced in the split to further strengthen it if deemed necessary, although it is not thought that this would be required. It will be possible to utilize the clip, or the combined clip and guide in other situations than that illustrated, if desired.

In order to prevent abrasion or cutting of the line by the outer end of the wire of the guides 18 18', the end portions are turned inwardly close to the next adjacent helix and slightly beyond, as shown at 25.

What is claimed:

1. A float comprising a buoyant body having a stem projecting therefrom, a combination guide and clip engaged on the stem comprising a single piece of wire having an intermediate portion engaged through the stem transversely, one end portion of the wire being coiled around the inner part of the stem, and the other being extended longitudinally outward thereof and having a plurality of helices formed therein.

2. As an improved article of manufacture, a combined line guide and clip comprising a piece of wire bent to form an inner series of helices forming a clip, an integral longitudinal portion thereon extending a considerable distance whereby it may be wrapped upon a float stem, the first mentioned helix being of greater diameter than and arranged to encircle the stem, and a second outer integral series of helices at the outer end of said longitudinal portion and spaced from the first series whereby it may lie longitudinally outwardly of the float stem and co-axial therewith.

3. A combined clip and guide formed of wire comprising a series of concentric closed coils, an inner terminal of lesser arc thereon, a transverse stem extended from the inner terminal of the coils, a longitudinal stem formed integrally at right angles to the first at its end opposite its connection with the coil, the junction of the two stems being within the arc of said concentric coils, and a series of open coils formed on the outer end of the last named stem.

4. A clip of the class described comprising a series of close coiled concentric wire helices, one terminal being inclined outwardly divergently from the adjacent helix, the other being turned inwardly of the arc of the concentric helices, a transverse stem formed on the inner terminal, and having an outer portion turned abruptly thereto, also within the arc of the concentric helices, and a supporting stem concentric to the clip and having a diameter equal to the length of the said transverse stem between said inner terminal and the outer abruptly turned portion of the transverse stem.

In testimony whereof I have hereunto set my hand in presence of two subscribing witnesses.

LOUIS F. PERRON.

Witnesses:
W. H. FREEMAN,
H. B. STRAIT.

Copies of this patent may be obtained for five cents each, by addressing the "Commissioner of Patents, Washington, D. C."